United States Patent Office 2,775,957
Patented Jan. 1, 1957

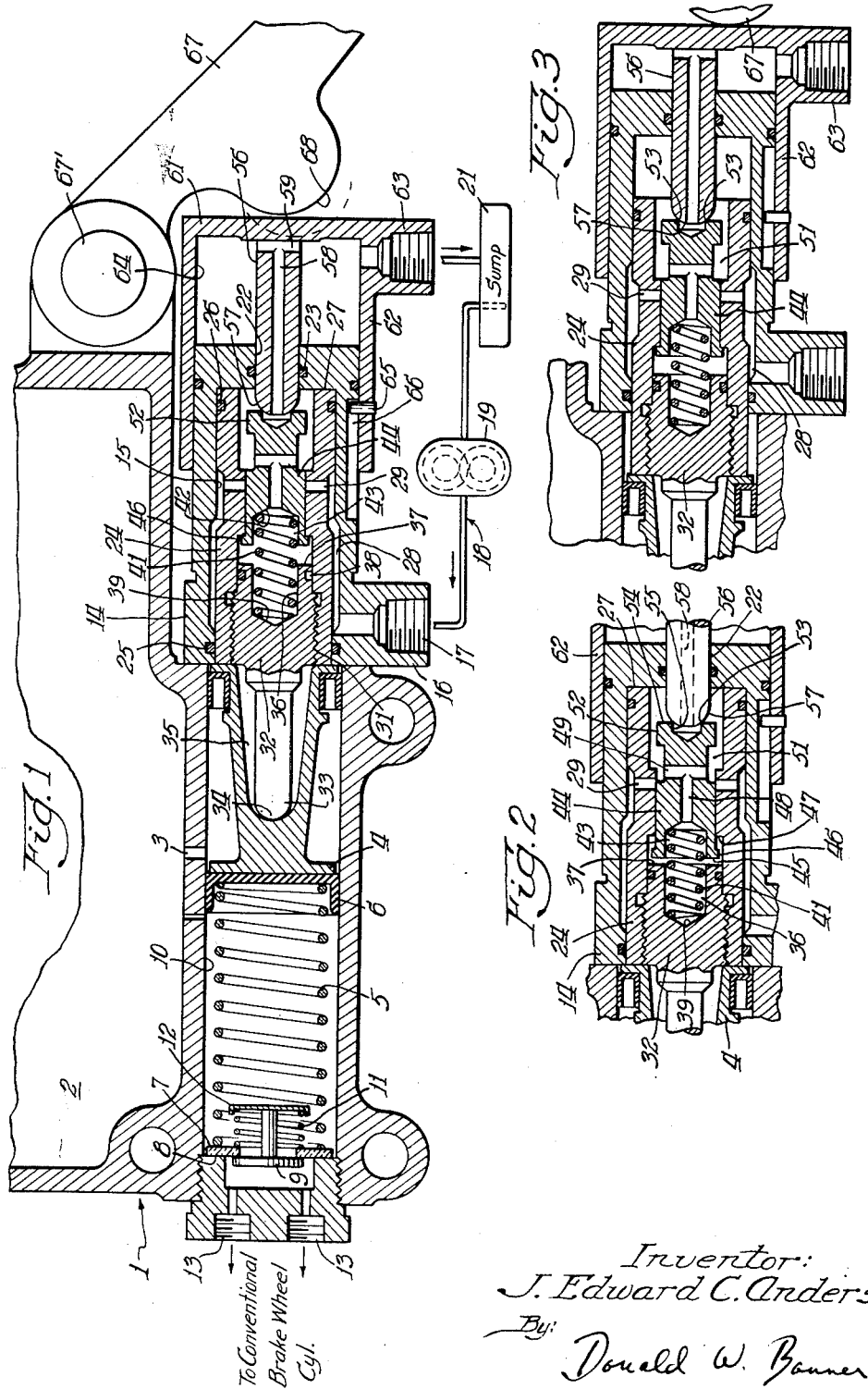

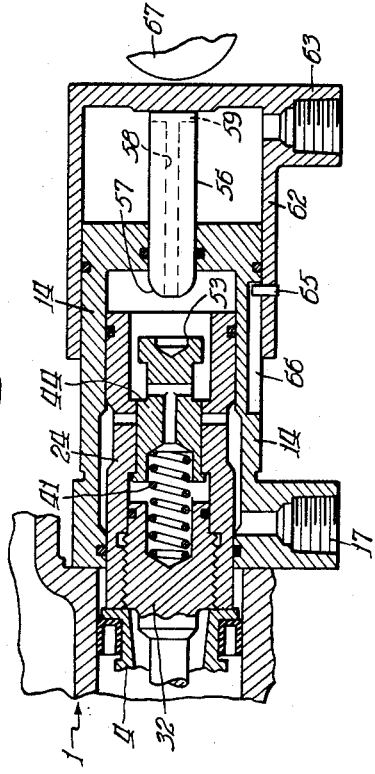
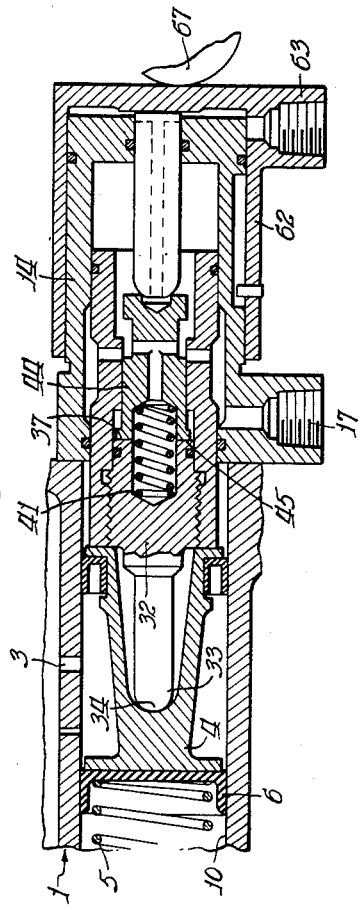

2,775,957

VALVED PISTON FOLLOW-UP SERVOMOTOR

J. Edward C. Anderson, East Cleveland, Ohio, assignor to Borg-Warner Corporation, Chicago, Ill., a corporation of Illinois Application December 31, 1954, Serial No. 479,030

2 Claims. (Cl. 121—41)

This invention relates to a booster valve, and more particularly to a booster valve particularly useful in controlling the application of brake pressure in a hydraulic braking system.

It has been found to be highly desirable in manually controlled brake systems, such as are found in the modern automobile, to employ a booster valve assembly which will control—in response to movement of an operator controlled lever—hydraulic force to a main hydraulic system, which will in turn control the application of the vehicle brakes. A booster valve assembly of this type should be such that the degree of braking power applied is proportional to the amount of movement of the operator controlled lever. In other words, it is desirable to retain a substantial amount of pedal "feel." It is also particularly advantageous to reduce the degree of pedal pressure required of the operator to a minimum value, while retaining this pedal "feel."

It is, therefore, one object of the present invention to provide an improved valve means which will accomplish the aforementioned and other desirable results.

Another object of the present invention is the provision of a device in accordance with the preceding object in which the valve means are self-operated to effect the application of a predetermined degree of pressure in response to a predetermined movement of the operator controlled lever.

Another object is the provision of a device in accordance with the preceding objects in which rectilinearly movable means are provided responsive to the movement of an operator controlled pedal or like mechanism, to effect the application of braking pressure, and in which further movable means are provided which are movable in response thereto to prevent the application of increased braking pressure.

Another object is the provision of a device in accordance with the preceding objects in which a spool is rectilinearly movable within a sleeve and is controlled by movement of the operator controlled pedal, the spool being moved rectilinearly upon movement of the pedal to a first position in which pressure from a supply is communicated to the interior of the sleeve, the sleeve thereupon being moved relative to the spool to limit the further application of pressure from the supply.

Another object of the present invention is the provision of a device in accordance with the preceding object in which the valve mechanism is completely operable despite failure of the hydraulic supply usually employed therewith.

Another object is the provision of a device in accordance with the preceding objects in which removal of operator pedal pressure effects withdrawal of the application of pressure from the braking mechanism.

Other objects and features of the invention will be readily apparent to those skilled in the art from the specification and appended drawings illustrating certain preferred embodiments in which:

Figure 1 is a side, sectional view through the mechanism of the present invention, certain parts being shown schematically;

Figure 2 is a partial view similar to Figure 1 showing the parts in moved position;

Figure 3 is a view similar to Figures 1 and 2, the parts being shown in another position;

Figure 4 is a view similar to the preceding figures showing the initial position of the parts upon removal of pressure from the operator controlled means;

Figure 5 is a view showing the operation of the device upon failure of the hydraulic supply.

The mechanism of the present invention is suitable for use with a conventional master cylinder assembly 1 which comprises a brake fluid reservoir 2 having an opening 3 in communication with a master cylinder piston 4 in the usual manner. The piston 4 is conventionally disposed in a suitable elongated, cylindrical opening in the assembly and biased toward the position illustrated in Figure 1 by means of a spring 5, the right end of which—as viewed in Figure 1—abuts against a cup-shaped retainer 6 against which the end of the piston 4 is disposed. The opposite end of the spring 5 abuts against a conventional washer 7. This washer has an outwardly facing surface 8 which, together with a valve member 9, forms a one-way valve mechanism, the member 9 being biased by means of spring 11—disposed between the washer 7 and a cap 12— toward the position illustrated in Figure 1. The retainer 6, the washer 7 and the surrounding circular walls define a variable volume chamber 10. It will be obvious to those skilled in the art that movement of the master cylinder piston 4 to the left, in the view of Figure 1, will effect the opening of the valve formed by the surface 8 and the member 9, so that the fluid in chamber 10 passes in the direction of the arrows in that figure, through the openings 13 which are connected to the conventional braking system. When the force on the master cylinder piston 4 is removed, the spring 5 effects its return to the position illustrated in Figure 1, the brake fluid returning through the ports 13 and around the outwardly facing surfaces of the washer 7 to the chamber 10.

The device of the present invention is particularly adapted for controlling the conventional system described above and comprises a housing 14 which is generally cup-shaped and is provided with a generally cylindrical opening 15 extending longitudinally therein. Housing 14 is also provided with a projection 16 having a suitable, threaded port portion 17 therein adapted to be connected to suitable conduit means illustrated diagrammatically at 18. The conduit means 18 are adapted to be connected to a suitable pumping or constant pressure generating means 19, which may also supply other pressure operated units, also connected to sump 21.

In the right end wall of the housing 14, in view of Figure 1, there is provided a generally circular aperture 22, a suitable sealing ring 23 communicating therewith for a purpose to be subsequently described.

Disposed within the opening 15 of the housing 14 is a sleeve 24, which is generally circular in cross section and which is provided with a generally cylindrical opening extending longitudinally therethrough. As shown in Figure 1, the outer wall of the sleeve 24 is adapted to cooperate with a suitable seal ring 25 disposed in the housing 14. Other seal means are provided in the sleeve at 26, which cooperates with the housing 14. The right end of the sleeve 24 in the view of Figure 1 is provided with an annular surface 27, for a purpose to be explained subsequently. Adjacent the left end portion of the sleeve 24, the inner wall of the housing 14 is recessed so as to provide an annular chamber 28 between the housing and the sleeve. This chamber 28, it should be noted, communicates with a plurality of apertures 29 which are peripherally spaced about, and extend through, the wall of the sleeve 24, so that the outer surface thereof is in communication with the inner cylindrical opening which extends longitudinally therethrough.

The inner, left portion of the sleeve 24, in the view of Figure 1, is provided with threads 31, which cooperate with a suitable threaded portion on a generally annular retainer 32 which is thereby fixedly mounted to sleeve 24. The left end of the retainer 32 is provided with an elongated projection 33 which terminates in a spherical portion 34 adapted to engage the innermost, rounded section of an opening 35 in the master cylinder piston 4. The opposite, inwardly extending end of the retainer 32 has cylindrical opening 36 therein, and the most inwardly portion of the retainer is provided with an annular, axially facing surface 37 for a purpose to be subsequently explained. Suitable sealing means 38 are provided between the outer periphery of the retainer 32 and the sleeve 24.

The end of the opening 36 in the retainer 32 is defined by a surface 39 against which one end of a spring 41 abuts; the opposite end of the spring 41 is disposed against a surface 42 which defines the innermost end of a generally cylindrical opening 43 extending longitudinally within a spool 44. The left end of spool 44, in the view of Figure 2, is provided with an annular, axially facing surface 45, for a purpose to be subsequently explained. As illustrated in Figure 1, this surface 45 is part of an outwardly extending projection 46, formed on the spool 44, which is adapted to cooperate with a suitable ledge 47 (see Figure 2) formed in the sleeve 24. The spool 44 is further provided with an elongated, longitudinally extending and circular opening 48 (see Figure 2), one end of which communicates with the opening 43, the other end thereof communicating with a transversely extending opening 49 which serves to communicate with the outside surfaces of the spool 44. It will, therefore, be seen that there is communication between the openings 43, 48, and 49 in the spool 44. The spool 44 is reduced in cross section in the area adjacent the opening 49 so as to provide a circular channel at 51, the right end of which is defined by a valve portion 52 of the spool 44. The portion 52 comprises a circular valve seat 53 defined by perpendicular walls 54 and 55, the former extending transversely of the spool 44, while the latter extends longitudinally thereof, as clearly illustrated in Figure 2.

Adapted to cooperate with the valve seat 53 is a valve 56 which is generally circular in cross section and which is provided with a spherical inner end portion 57 adapted to sealably engage the valve seat 53. The circular valve 56, as illustrated in the figures, extends through the opening 22 formed in the end wall of housing 14 and is reciprocable therein. Extending longitudinally through the valve 56 is a generally circular opening 58 which communicates with the exterior surface of the spherical valve end 57, and further communicates with a suitable transverse aperture 59 (see Figure 1) also formed in the valve 56, the aperture 59 extending across the valve 56, so that there is free communication of the opening 58 with the exterior of that portion of the valve 56 which projects outwardly of the housing 14.

The valve 56 is fixedly mounted to the bottom wall 61 of a generally cup-shaped cap portion 62. The cap 62 is provided with an extension 63 for connection with suitable conduit connecting the inner portion of the cap 62 to the sump 21. The cap portion 62 is generally circular in cross section and has an opening 64 therein surrounding the valve 56, the opening being defined by the side walls of the cap 61 which are positioned so that the cap is reciprocably mounted on the end of housing 14. In one of these walls there is disposed a pin 65 which extends therethrough, the inner end thereof cooperating with a slot 66 slightly wider than pin 65 formed in the outer periphery of the housing 14 so to limit the outward rotational movement of the cap 61. Pivotally mounted to the mechanism at 67' is a brake pedal 67 adapted to be depressed by an operator and having a rounded portion 68 adapted to engage the outer surface of the wall 61 of the cap 62.

The operation of the device will now be described. Normally, the valve assumes the position illustrated in Figure 1, while the pedal 67 is disposed as shown in that figure. The spring 5 biases the piston 4, and consequently the retainer 32 and the sleeve 24 attached to the retainer, to the position illustrated in Figure 1, while the spring 41 also biases the spool 44 to the right, so that the projections 46 thereon engage the ledge 47 on the sleeve 24. The spherical end 57 of the valve 56 lightly engages the valve seat 53, formed on the valve portion 52 of the spool 44. The pump 19 supplies fluid through the conduit means 18 and porting 17 to fill the generally annular chamber 28 between the sleeve 24 and housing 14. This fluid under pressure also fills the apertures 29 in the sleeve 24.

When the pedal 67 is pivoted in a clockwise direction about its pivot point 67', the cap portion 62 is moved toward the left, the valve 56 sliding through the opening 22 formed in the outer end of the housing 14 while the walls of cap 62 slide over the complementary exterior of housing 14, suitable seal means being provided therebetween as illustrated. Assuming that the pedal 67 is moved from the position indicated in Figure 1 to that indicated in Figure 2, and stopped in the latter position, the position of the parts illustrated in Figure 2 is a transitory one. As the valve 56 is moved from the Figure 1 to the Figure 2 position by virtue of the aforementioned pedal movement, a movement to the left of spool 44 is effected, against the bias of the spring 41. When the spool 44 is moved to the left sufficiently so that the left boundary of the channel 51 uncovers a portion of the apertures 29, as shown in Figure 2, fluid under pressure from pump 19 is forced inwardly into the cylindrical opening which extends longitudinally through the sleeve 24. Under such conditions it will be seen that hydraulic fluid under pressure will flow around the right end portion of the spool 44, and apply a force on the inner end of the valve 56 which tends to move it toward the right. Assuming that the pedal is maintained under pressure by the operator so that this outward movement of the valve 56 is prevented, fluid under pressure will fill the chamber surrounding the right end of the spool 44 and the inner end portion of the valve 56 and will exert a force to the left on the surface 27 of the sleeve 24. In addition, fluid under pressure will pass through the opening 49 and the opening 48 into the opening 43, formed in the valve spool 44, so as to fill that opening; and also into the opening 36 in the retainer 32 so as to entirely surround the spring 41, and fill completely the chamber in which it is disposed. This fluid will exert a force to the left on the surface 37 of the retainer 32, as well as on the surface 39 thereof, which is also urged toward the left by spring 41. Fluid forces will also tend to move the valve spool 44 toward the right, but such movement is precluded by virtue of the force applied by, and maintained by, the pedal 67. The forces to the left on the sleeve 24, and on the retainer 32 which is attached to the sleeve 44, will be such, however, that the sleeve 24-retainer 32 assembly will be moved to the left and away from the position illustrated in Figure 2. When this occurs, it is obvious that the master cylinder piston 4 will be moved toward the left against the bias of the spring 5 by virtue of the engagement between that piston and the rounded end 34 of the retainer 32. Under this circumstance, the fluid in the chamber in which the spring 5 is disposed will be forced outwardly, as previously described, past the valve member 9 and through the porting 13 to the conventional brake system whereby the fluid will effect the application of a predetermined braking pressure at the vehicle wheels.

It is important to notice, however, that as the sleeve 24-retainer 32 assembly moves toward the left from the position illustrated in Figure 2, the apertures 29 in the sleeve 24 will be carried away from the channel 51 and the inner ends blocked by the body of spool 44 (these relative positions of spool 44 and sleeve 24 being illustrated in Figure 3), so that further communication between the annular opening 28 surrounding the exterior of the sleeve 24 and the interior opening in that sleeve will be interrupted. The pressurized fluid admitted to the interior opening in the sleeve 24 will thereby be trapped therein inasmuch as the apertures 29 are blocked and the valve 56 is tightly seated against the cooperating valve seat 53. As a result, a predetermined equilibrium of forces is established, the spring 5 and brake line pressure opposing further motion to the left of the sleeve 24-retainer 32 assembly and only a predetermined force is applied to the brakes. If desired, additional pressure may be applied by the operator by virtue of further clockwise pivotal movement of the pedal 67—for example, to the position illustrated in Figure 3—the cap member 62 sliding to the left and carrying the valve 56 inwardly somewhat more than was the case illustrated in Figure 2. As the inner end of the valve 56 is moved from the position of Figure 2 to that illustrated in Figure 3, initially the channel 51 would further uncover the apertures 29 whereupon the sleeve 24-retainer 32 assembly would be forced to the left an additional amount against the bias of spring 5 and brake line pressure, and additional fluid would be forced outwardly from the chamber 10—in which spring 5 is disposed—so that increased braking force would be applied to the vehicle wheels.

When the operator desires to remove the braking pressure applied, he may release the pedal 67. Under such condition, the pressurized fluid in the chamber surrounding the right end of the spool 44, operating immediately against the exposed portion of the spherical end 57 of the valve 56, will move valve 56 toward the right, away from the valve seat 53. Pedal 67 will thereby be pivoted counterclockwise about pivot 67'. The fluid pressure in the cylindrical opening which extends longitudinally through the sleeve 24 will then immediately be relieved, by virtue of passage through the openings 58 and 59 in valve 56, whereby this fluid under pressure may pass through the porting 63 and return to the sump 21. The initial portion of this described action is illustrated in Figure 4 in which the pressure has moved the valve 56 toward the right away from the valve seat 53 to a distance determined by the engagement of the pin 65 with the outer end of a suitable slot in the housing 14. The pressurized fluid will then rapidly escape, as described above, to the sump, the springs 5 and 41 effecting rapid return of the parts to the position illustrated in Figure 1. Simultaneously the fluid in the brake lines will return through the porting 13 and around the outer periphery of the washer 7 so as to re-enter the chamber 10.

Should the pump 19 fail for any reason to deliver pressurized fluid to the valve, it will be seen that the vehicle brakes may still be applied. This may best be understood from an examination of Figure 5, in which the pedal 67 has been rotated in a clockwise direction about its pivot 67' until the valve 56 has been moved inwardly to such a degree that the surface 45 of the spool 44 and the surface 37 of the retainer 32 have been engaged against the bias of spring 41, the retainer 32 then mechanically being forced against the bias of spring 5 and brake line pressure toward the left. As previously described, this will cause brake fluid to pass outwardly through the porting 13 to the braking means of the vehicle, as will be readily apparent to those skilled in the art.

It will, therefore, be seen that the device of the present invention provides for the application of a predetermined amount of braking pressure at the vehicle wheels which is proportional to the amount of movement of an operator controlled pedal or like mechanism. In addition, it should also be noticed that the operator controlled pedal is moved against a force of opposition supplied by the hydraulic fluid in the booster valve, so that important "feel" is retained. It is also important to note that these advantages are achieved by means which are simple and economical, and which operate even though the fluid supply to the booster valve should be interrupted. It will further be obvious to those skilled in the art that the ratio between the pressure applied and the force opposing movement of the operator controlled lever may be varied as desired, and that the device of the present invention is also adapted for advantageous usage with various types of units, such as clutches or punching devices, in addition to its application in braking systems.

I claim:

1. In a device of the class described adapted to control movement of a master cylinder piston or the like, a generally cup-shaped housing, a generally cylindrical first member disposed for longitudinal movement in said housing and having an elongated longitudinally extending opening therein, means defining fluid passages in said first member communicating the exterior thereof with said opening therein, means in said housing adapted to carry pressurized fluid to said passages, a second generally cylindrical member disposed for longitudinal movement in said opening having an external surface normally disposed in engagement with said fluid passage means to prevent fluid flow therethrough, operating means movable into and out of engagement with one of said members constructed and arranged to effect relative movement between said members to permit fluid flow through said fluid passages at will, means biasing said members against such relative movement, means on said second member comprising surfaces responsive to pressurized fluid after its flow through said passages assisting said biasing means, means on said first member including a portion projecting exteriorly thereof and out of one end of said housing adapted to engage a spring biased master cylinder piston, means on said first member comprising surfaces responsive to pressurized fluid after its flow through said passages adapted to effect movement of said first member toward said one end of said housing and consequent movement of said master cylinder to braking position and simultaneous movement of said fluid passage defining means to a position in engagement with said external surface of said second member whereby further fluid flow through said passages into said opening is prevented.

2. The device defined in claim 1 further being so constructed and arranged to effect simultaneous mechanical movement of said first member, said second member, and said master cylinder piston upon failure of the fluid passage supply.

References Cited in the file of this patent

UNITED STATES PATENTS

| | | |
|---|---|---|
| 2,241,374 | Alfieri | May 13, 1941 |
| 2,265,817 | Rockwell | Dec. 9, 1941 |
| 2,395,223 | Ingres | Feb. 19, 1946 |
| 2,410,269 | Chouings | Oct. 29, 1946 |
| 2,500,450 | Carleton | Mar. 14, 1950 |
| 2,544,042 | Pontius | Mar. 6, 1951 |

FOREIGN PATENTS

| | | |
|---|---|---|
| 384,678 | Great Britain | Dec. 9, 1932 |